US010628808B2

(12) United States Patent
Carretta et al.

(10) Patent No.: US 10,628,808 B2
(45) Date of Patent: Apr. 21, 2020

(54) AUTOMATIC SAVINGS PROGRAM

(71) Applicant: Bank of America Corporation, Charlotte, NC (US)

(72) Inventors: Daniel A. Carretta, Clover, SC (US); Thomas M. Hancock, Charlotte, NC (US); Karen K. Lewy, West Lake Village, CA (US); Charles R. Liu, Charlotte, NC (US); Jack Meyers, Clayton, CA (US); Sheryl W. Strott, Clover, SC (US); Faith A. Tucker, Witchita, KS (US); Carrie A. Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/109,269

(22) Filed: Dec. 17, 2013

(65) Prior Publication Data
US 2014/0108237 A1  Apr. 17, 2014

Related U.S. Application Data

(63) Continuation of application No. 13/613,433, filed on Sep. 13, 2012, now Pat. No. 8,635,137, which is a (Continued)

(51) Int. Cl.
G06Q 20/10 (2012.01)
G06Q 20/40 (2012.01)
G06Q 40/02 (2012.01)

(52) U.S. Cl.
CPC ............ G06Q 20/10 (2013.01); G06Q 20/40 (2013.01); G06Q 40/02 (2013.01); G06Q 40/025 (2013.01)

(58) Field of Classification Search
CPC ..... G06Q 20/10; G06Q 20/102; G06Q 20/105
(Continued)

(56) References Cited

U.S. PATENT DOCUMENTS 4,750,119 A   6/1988  Cohen et al.
4,823,264 A   4/1989  Deming
(Continued)

FOREIGN PATENT DOCUMENTS

JP   200350916   2/2003
WO   9314476    7/1993
(Continued)

OTHER PUBLICATIONS

Wachovia Introduces New Product That Makes Saving Easy and Automatic for Consumers, http://www.wachovia.com/inside/page/printer/0,,134_307%5E1701,00.html, 3 pages, dated Jan. 11, 2008.
(Continued)

Primary Examiner — Hai Tran
(74) Attorney, Agent, or Firm — Banner & Witcoff, Ltd.; Michael A. Springs

(57) ABSTRACT

A computer implemented method of processing a financial transaction executed by first person includes determining an automatic savings amount from the financial transaction by rounding up the amount of the financial transaction to the nearest dollar. The method further includes debiting the calculated savings amount from an account of the first person and crediting the savings amount to an account of a second person.

11 Claims, 5 Drawing Sheets

Related U.S. Application Data continuation of application No. 12/554,395, filed on Sep. 4, 2009, now Pat. No. 8,301,530, which is a continuation of application No. 11/161,418, filed on Aug. 2, 2005, now abandoned.

(58) Field of Classification Search
USPC .......................................................... 705/35
See application file for complete search history.

(56) References Cited

U.S. PATENT DOCUMENTS

| | | | |
|---|---|---|---|
| 4,941,090 | A | 7/1990 | McCarthy |
| 5,056,019 | A | 10/1991 | Schultz et al. |
| 5,200,889 | A | 4/1993 | Mori |
| 5,287,268 | A | 2/1994 | McCarthy |
| 5,302,811 | A | 4/1994 | Fukatsu |
| 5,466,919 | A | 11/1995 | Hovakimian |
| 5,471,669 | A | 11/1995 | Lidman |
| 5,621,640 | A | 4/1997 | Burke |
| 5,787,404 | A | 7/1998 | Fernandez-Holmann |
| 5,970,480 | A | 10/1999 | Kalina |
| 5,987,429 | A | 11/1999 | Maritzen et al. |
| 6,036,344 | A | 3/2000 | Goldenberg |
| 6,049,778 | A | 4/2000 | Walker et al. |
| 6,088,682 | A | 7/2000 | Burke |
| 6,112,191 | A * | 8/2000 | Burke ................. G06Q 20/04 235/375 |
| 6,119,099 | A | 9/2000 | Walker et al. |
| 6,164,533 | A | 12/2000 | Barton |
| 6,267,760 | B1 | 7/2001 | Walker et al. |
| 6,298,329 | B1 | 10/2001 | Walker et al. |
| 6,381,590 | B1 | 4/2002 | Debois |
| 6,581,041 | B1 | 6/2003 | Canney |
| 6,598,024 | B1 | 7/2003 | Walker et al. |
| 6,631,358 | B1 | 10/2003 | Ogilvie |
| 7,072,851 | B1 | 7/2006 | Wilcox et al. |
| 7,392,224 | B1 | 6/2008 | Bauer et al. |
| 7,753,261 | B2 | 7/2010 | Rosenblatt et al. |
| 7,797,208 | B2 | 9/2010 | Thomas |
| 8,301,530 | B2 | 10/2012 | Carretta et al. |
| 8,401,936 | B2 | 3/2013 | Penning et al. |
| 8,416,924 | B1 | 4/2013 | Barth et al. |
| 8,635,137 | B2 | 1/2014 | Carretta et al. |
| 8,738,429 | B2 | 5/2014 | Shepard |
| 9,495,703 | B1 | 11/2016 | Kaye, III |
| 9,734,536 | B2 | 8/2017 | Cruttenden et al. |
| 2002/0046124 | A1 | 4/2002 | Alderucci et al. |
| 2002/0120513 | A1 | 8/2002 | Webb et al. |
| 2002/0161630 | A1 | 10/2002 | Kern et al. |
| 2002/0188533 | A1 | 12/2002 | Sanchez et al. |
| 2003/0009379 | A1 | 1/2003 | Narasimhan et al. |
| 2003/0061097 | A1 | 3/2003 | Walker et al. |
| 2003/0064788 | A1 | 4/2003 | Walker et al. |
| 2003/0101131 | A1 | 5/2003 | Warren et al. |
| 2003/0149629 | A1 | 8/2003 | Claridge et al. |
| 2003/0200163 | A1* | 10/2003 | O'Riordan ............. G06Q 40/02 705/35 |
| 2003/0208439 | A1 | 11/2003 | Rast |
| 2003/0233317 | A1 | 12/2003 | Judd |
| 2004/0039645 | A1 | 2/2004 | Walker et al. |
| 2004/0054593 | A1 | 3/2004 | Van Luchen |
| 2004/0138953 | A1 | 7/2004 | Van Luchen et al. |
| 2004/0153400 | A1 | 8/2004 | Burke |
| 2004/0193497 | A1 | 9/2004 | Tanaka |
| 2004/0222285 | A1 | 11/2004 | Pohl |
| 2005/0004867 | A1 | 1/2005 | Spector |
| 2005/0021353 | A1 | 1/2005 | Aviles et al. |
| 2005/0021363 | A1 | 1/2005 | Stimson et al. |
| 2005/0097034 | A1* | 5/2005 | Loeger ................. G06Q 20/00 705/39 |
| 2006/0047589 | A1 | 2/2006 | Grau |
| 2007/0033134 | A1 | 2/2007 | Carretta et al. |
| 2007/0094130 | A1 | 4/2007 | Burke |
| 2009/0063332 | A1 | 3/2009 | Tabaczynski et al. |
| 2010/0076776 | A1 | 3/2010 | Kopko et al. |
| 2012/0072345 | A1 | 3/2012 | Solomon et al. |
| 2012/0197794 | A1 | 8/2012 | Grigg et al. |
| 2013/0030992 | A1 | 1/2013 | Carretta et al. |
| 2014/0006275 | A1 | 1/2014 | Hanson et al. |
| 2014/0012691 | A1 | 1/2014 | Hanson et al. |
| 2014/0222636 | A1 | 8/2014 | Cheng et al. |
| 2014/0337150 | A1 | 11/2014 | Anand |
| 2015/0081458 | A1 | 3/2015 | Cruttenden et al. |
| 2015/0193866 | A1 | 7/2015 | Van Heerden et al. |
| 2015/0193867 | A1 | 7/2015 | Del Vecchio et al. |
| 2015/0230045 | A1 | 8/2015 | Johnson et al. |
| 2016/0042340 | A1 | 2/2016 | Burke et al. |
| 2016/0321663 | A1 | 11/2016 | Batlle |

FOREIGN PATENT DOCUMENTS

| | | |
|---|---|---|
| WO | 003030054 | 4/2003 |
| WO | 2007016697 | 2/2007 |
| WO | 2008111965 | 9/2008 |

OTHER PUBLICATIONS

Wachovia offers customers Way2Save, http://www.charlotte.com/business/v-print/story/441323.html, 1 page, downloaded Jan. 11, 2008.

Wachovia, My Arch-Nemesis Bank, Offers Very Tempting 5% Plus Bonus Savings Account Deal, http://www.punny.org/money/wachovia-my-arch-nemesis-bank-offers-v . . . , 7 pages, downloaded Jan. 11, 2008.

Wachovia offers new savings incentive that offers deposit match, http://www.timesanddemocrat.com/articles/2008/01/11/business/doc478 . . . , 2 pages, downloaded Jan. 11, 2008.

Wachovia's Way2Save Savings Account, with cans, http://bankdesign.com/board/t12618.html., 3 pages, downloaded Jan. 11, 2008.

Wachovia Way2Save(SM) Account Agreement, http://www.wachovia.com/misc/0,,1756,00.html, 2 pages, downloaded Jan. 18, 2008.

Finance, http://www.fatwallet.com/t/52/799201/, 11 pages, downloaded Jan. 11, 2008.

Way2Save, Turn Everyday Banking Into Automatic Savings brochure, © 2008, Wachovia Corporation, 6 pages.

Banco Popular Ahorro Directo, http://www.popular.com/ahorrodirectto/index-en.html, downloaded Mar. 11, 2008, 3 pages.

Option1 Credit Union Spare Change Debit Card Savings Program, http://www.option1cu.org/about-bell-com/news.html, downloaded Feb. 3, 2008, 2 pages.

Wachovia Personal Finance FAQs, Way2Save Account, http://111.wachovia.com/personal/page/printer/0,,657_2167%5E12663 . . . , downloaded Mar. 11, 2008, 3 pages.

Wolfe, Daniel, "Wachovia Links Savings, Debit to Land Customers," American Banker, vol. 173, issue 9, Jan. 14, 2008, 3 pages.

Option1 Credit Union, Options News About Opportunity, Jan. 2008, 5 pages.

*Every Penny Counts, Inc.* v. *Bank of America Corporation and Bank of America, N.A.*; Opinion and Order; U.S. District Court, Middle District of Florida, Fort Meyers Division, Case No. 2:07-cv-04-FtM-29SPC, dated Sep. 29, 2008, 16 pages.

*Every Penny Counts, Inc.* v. *Bank of America Corporation and Bank of America, N.A..*; Memorandum and Order, U.S. District Court, Middle District of Florida, Fort Meyers Division, Case No. 2:07-cv-042, dated May 27, 2009, 6 pages.

International Search Report, PCT/US 06/30362, dated Aug. 17, 2007, 6 pages.

Supplementary European Search Report, PCT/US2006030362, dated Jul. 30, 2010, 5 pages.

Communication from European Patent Office, Application No. 06 789 359.4 0 2221, dated Jul. 14, 2011, 5 pages.

Round it Up America®, Round Up. Donate Change. Make a Difference, http://www.rounditupamerica.org, downloaded Nov. 8, 2010, 2 pages.

Bank the Rest® savings program, Spend and Save. Together at last, http://www.scotiabank.com/BankTheRest, downloaded Jan. 25, 2012, 1 page.

(56) References Cited

OTHER PUBLICATIONS

Round It Up America®, Round up. Donate Change, Make a Difference, Support Round It Up America® today!, http://www.rounditupamerica.org/donate-online.php, downloaded Jan. 25, 2012, 2 pages.
Round It Up America®, Round up. Donate Change, Make a Difference. Recent News, http://www/rounditupaemrica.org, downloaded Jan. 25, 2012, 3 pages.
Best Bets Financial Services, Premier Bank, http://www.connectmidmissouri.com/directory/financial/premium.aspx?id=1761644, downloaded Jan. 25, 2012, 4 pages.
North Carolina Bank and Trust, Round Up to Save, https:/www.ncbtonline.com/productsandservices/personal/rounduptosave.aspx, downloaded Jan. 25, 2012, 2 pages.
Introducing Free Checking with Extra Savings on top, Savings just got a whole lot easier, Capital One Bank, Baton Rouge Advocate, Oct. 28, 2009, 1 page.
Text of First Office Action, PCT Application No. 20078005099965, Undated, 3 pages.
The Patent Office of the People's Republic of China, Second Office Action, dated Aug. 18, 2011, Application No. 200780050996.5, 6 pages.
Office Action dated Dec. 13, 2011, Application No./Patent No. 0689359.4-221/1915731, 18 pages.
Office Action dated Jul. 14, 2011, Application No. 06 689359.4-2221, 5 pages.
Response to Office Action dated Jun. 14, 2011, PCT Application PCT/US2006/030362, 11 pages.
Response to Office Action dated Nov. 24, 2011, PCT Application PCT/US2006/030362, 4 pages.
File History for U.S. Patent Application as of Apr. 27, 2012, U.S. Appl. No. 11/161,418, filed Aug. 2, 2005.
File History for U.S. Patent Application as of Sep. 7, 2012, U.S. Appl. No. 12/368,034, filed Feb. 9, 2009.
File History for U.S. Patent Application as of Sep. 7, 2012, U.S. Appl. No. 12/554,616, filed Sep. 4, 2009.
File History for U.S. Patent Application as of Sep. 7, 2012, U.S. Appl. No. 12/730,394, filed Mar. 24, 2010.
Who Says You Can't Afford to Save? Bank on it: Spare Change Can Add Up Fast (Third Edition), Jaffe, C.A., Mar. 5, 2000 © 2012 ProQuest LLC, 3 pages.
Notice of Allowance and Fee(s) Due dated Sep. 24, 2012 for U.S. Appl. No. 12/554,935, 10 pages.
"Electronic Payments Primer", National Electronic Commerce Coordinating Council, Oct. 2002, http://www85.homepage.villanova.edu/timothy.ay/MIS3030/epayments_primer.pdf, 40 pages.
Aug. 28, 2013—U.S. Advisory Action—U.S. Appl. No. 12/730,394.
Bank of America's Twist on Debit Card Rewards, dated Oct. 6, 2005, www.depositaccounts.com/blog/2005/10/bank-of-americas-twist-on-debit-card-html, 1 page.
Bank of America offers a new way to save, dated Oct. 4, 2005, www.msnbc.msn.com/id/9593071/#.UL463-SCmSo, 2 pages.
Bank of America's Unusual Automated Savings Plan by Jim Bruene, dated Oct. 5, 2005, © 1995-2010, Financial Insite, Inc., 2 pages.
Nov. 27, 2012—U.S. Non-Final Office Action—U.S. Appl. No. 13/613,433.
Fowler, G.A., These Apps Can Finally Get you to Save Money, <http://www.wsj.com/articles/these-apps-can-finally-get-you-to-save-money-1434477296?mod=djemptech_t>, printed Oct. 6, 2015; 5 pages.
Aug. 2, 2005—(US)—Related U.S. Appl. No. 11/161,418.
Feb. 8, 2008—(US)—.Related U.S. Appl. No. 61/027,397.
Feb. 9, 2009—(US)—Related U.S. Appl. No. 12/368,034.
Sep. 4, 2009—(US)—Related U.S. Appl. No. 12/554,616.
Mar. 24, 2010—(US)—Related U.S. Appl. No. 12/730,394.
Feb. 6, 2007—(PCT)—Related Application No. PCT/US07/61694.
Dec. 20, 2017—U.S. Office Action—U.S. Appl. No. 14/844,884.
Nov. 27, 2017—U.S. Office Action—U.S. Appl. No. 14/850,593.
Apr. 23, 2018—U.S. Office Action—U.S. Appl. No. 14/844,880.
Jan. 8, 2018—U.S. Office Action—U.S. Appl. No. 14/844,880.
Jan. 10, 2018—U.S. Office Action—U.S. Appl. No. 14/844,896.
Jan. 18, 2018—U.S. Office Action—U.S. Appl. No. 14/844,875.
Jan. 18, 2018—U.S. Office Action—U.S. Appl. No. 14/844,887.
Jul. 27, 2018—U.S. Office Action—U.S. Appl. No. 14/844,896.
May 21, 2018—U.S. Office Action—U.S. Appl. No. 14/850,593.
Sep. 7, 2018—U.S. Office Action—U.S. Appl. No. 14/551,930.
May 14, 2019—U.S. Office Action—U.S. Appl. No. 14/551,930.
Dec. 2, 2019—(US) Patent Board Decision—Examiner Reversed U.S. Appl. No. 14/109,269.

* cited by examiner

AUTOMATIC SAVINGS PROGRAM

This application is a continuation of U.S. patent application Ser. No. 13/613,433, filed Sep. 13, 2012, which claims priority to U.S. patent application Ser. No. 12/554,395, filed Sep. 4, 2009, issued Oct. 30, 2012 as U.S. Pat. No. 8,301,530, which claims priority to U.S. application Ser. No. 11/161,418, filed Aug. 8, 2005, which was abandoned. All of the aforementioned are incorporated by reference in their entirety herein.

FIELD OF THE INVENTION

One embodiment of the present invention is directed to the computer processing of a consumer savings program. More particularly, one embodiment of the present invention is directed to the computer processing of a consumer savings program that provides for automatic savings during any transaction.

BACKGROUND INFORMATION

Many consumers feel that saving money is difficult. Those who make less than the median income level, or are raising families, or are new immigrants, find it particularly challenging to put money away for emergencies, a child's education, or a special purchase. Even affluent consumers who do have the means to save money often feel that they could save more.

Currently, a consumer can save funds in a bank account by making deposits into the account or by transferring funds from another account. Further, they can automate the savings function by setting up recurring transfers from another account. However, the recurring transfer function is limited by the requirement to set a specific and minimum transfer amount and the need for the transfer to occur on a particular schedule. The recurring transfer function does not adequately support the flexibility of daily or small amount transfers.

In addition, grandparents or other relatives or friends sometimes desire to contribute money to somebody else's (e.g., a grandchild's) savings account. These contributors likely desire an automatic and pain free way to facilitate such a transfer of funds.

Based on the foregoing, there is a need for a system and method for automatically facilitating savings.

SUMMARY OF THE INVENTION

One embodiment of the present invention is a computer implemented method of processing a financial transaction executed by first person. The method includes determining an automatic savings amount from the financial transaction by rounding up the amount of the financial transaction to the nearest dollar. The method further includes debiting the calculated savings amount from an account of the first person and crediting the savings amount to an account of a second person.

DETAILED DESCRIPTION

One embodiment of the present invention is a computer implemented savings program in which each financial transaction by a customer of a bank or other financial institution automatically generates a savings amount which is deposited in the customer's or somebody else's savings account. Thus the customer can accumulate savings conveniently and painlessly.

Figure 1:
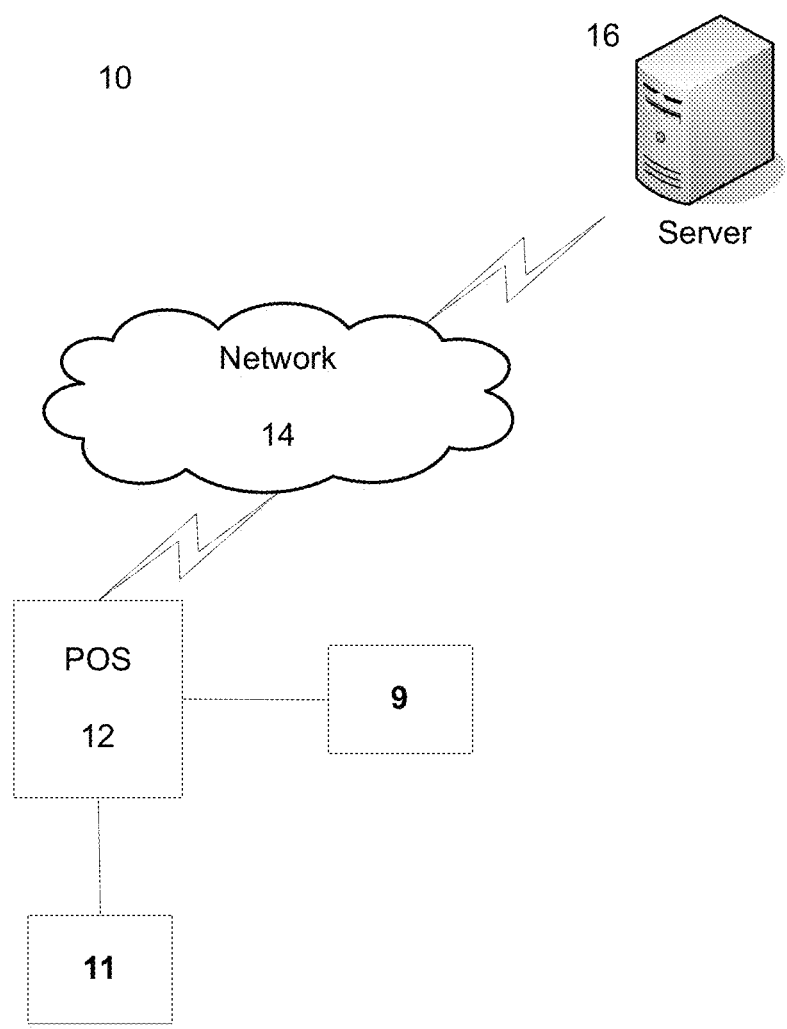
FIG. 1 is an overview diagram of a system in accordance with one embodiment of the present invention.

FIG. 1 is an overview diagram of a system 10 in accordance with one embodiment of the present invention. System 10 includes a point of sale device ("POS") 12 coupled to a computer server 16 via a network 14.

POS 12 is an electronic cash register that includes a barcode reader 9 that is used to read barcodes on products and to automatically enter the products and prices into POS 12. POS 12 further includes a card reader 11 that reads account information from a credit card, debit card, or any other type of financial device that can be used to purchase an item. POS 12 may include other devices, such as a keypad, that can also be used to read account information for facilitating a transaction. In one embodiment, POS 12 is located at a retailer.

Network 14 can be any type of network or communication device that allows POS 12 to communicate with server 16. Network 14 includes one or more routers or computer systems. In one embodiment, network 14 includes a computer system operated by the issuer of the credit card or debit card/check card used to make a purchase at POS 12 (e.g., a computer system operated by VISA).

Server 16 is a computer system operated by a bank or other financial institution that is implementing an embodiment of the present invention. Server 16 may be any type of computer or other device that is capable of communicating with network 14 and executing software steps. In one embodiment, server 16 includes a processor, memory and communication interface.

Figure 2:
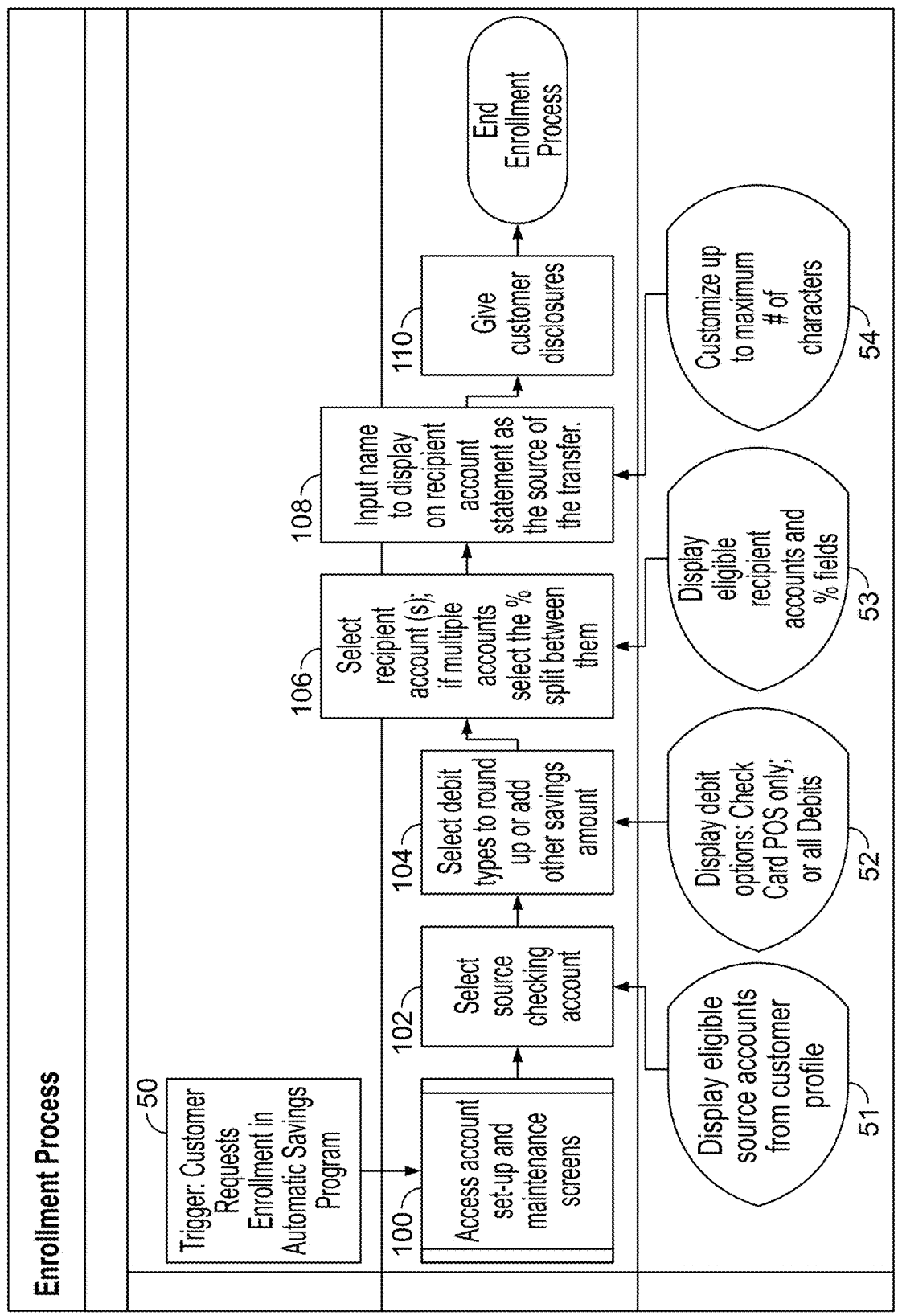
FIG. 2 is a flow diagram of the functionality performed by a server in accordance with one embodiment of the present invention in order to enroll a customer in the automatic savings program.

FIG. 2 is a flow diagram of the functionality performed by server 16 in accordance with one embodiment of the present invention in order to enroll a customer in the automatic savings program. In one embodiment, the functionality of FIG. 2, and FIGS. 35 disclosed below, is implemented by software stored in memory and executed by a processor. In other embodiments, the functionality can be performed by hardware, or any combination of hardware and software.

100: Account set-up and maintenance screens/interfaces are accessed in response to a customer request to enroll in the automatic savings program (50). In one embodiment, the screens/interfaces are accessed by bank personnel at a terminal locally or remotely connected to server 16. In another embodiment, a user may access the screens/interfaces at a terminal remotely connected to server 16 through network 14.

102: The checking account that is the source of the automatic savings amount is selected. The eligible source accounts are displayed from the customer's profile. In other embodiments, another type of account instead of a checking account can be used, as long as the selected account is a source of funds.

104: The types of debits/transactions that are to be "round up" are selected. "Round up" refers to one method used to calculate a savings amount from a transaction. In one embodiment, the round up amount is an amount of excess funds produced by applying a rounder transaction to the amount of a transaction such as a credit/debit card charge at POS 12. If the rounder transaction rounds up to the nearest dollar, for example, a purchase made for $54.08 would generate a rounded amount of $0.92. Other embodiments of the present invention may round up to a predetermined amount besides the nearest dollar. Still further, other embodiments of the present invention may calculate the savings amount using a method other than round up. For example, a fixed percentage can be applied to each transaction to calculate a savings amount, or a fixed amount of money (e.g., $130) can be considered the savings amount. The available debits/transaction types to be round up are displayed (52) and can include only check card/debit card POS transactions, or any other types of debits. Example of other debits that can be the subject of round up or other calculation of a savings amount include paper checks, electronic bill pay, electronic checks, automatic payments and Automated Clearing House ("ACH") transfers.

106: The recipient account or accounts for the savings amount is selected based on the displayed eligible recipient accounts and % fields or the account number can be inputted. In one embodiment, possible recipient accounts include the customers own savings account, person to person transfer (e.g., a grandparent's round ups being credited to a grandchild's savings account or 529 college savings plan), charities, investment accounts, etc. In general, any account that can accept transfers can be eligible for selection. If multiple recipient accounts are selected, the customer can choose a percentage distribution for each of the accounts, or another mechanism that can be used to divide the savings amount between the multiple accounts.

108: The name to display on the recipient's account statement as the source of the transfer is input.

The name may be customized to a maximum number of characters or may default to a pre-set description. For example the account statement might state "a Transfer From Grandma".

110: The customer is given disclosures that for example, describe the customer's selections and the legal ramifications of such selections.

An embodiment of the present invention also allows the customer to modify parameters or discontinue enrollment at any time remotely using an online banking feature or other remote computing technology.

Figure 3:
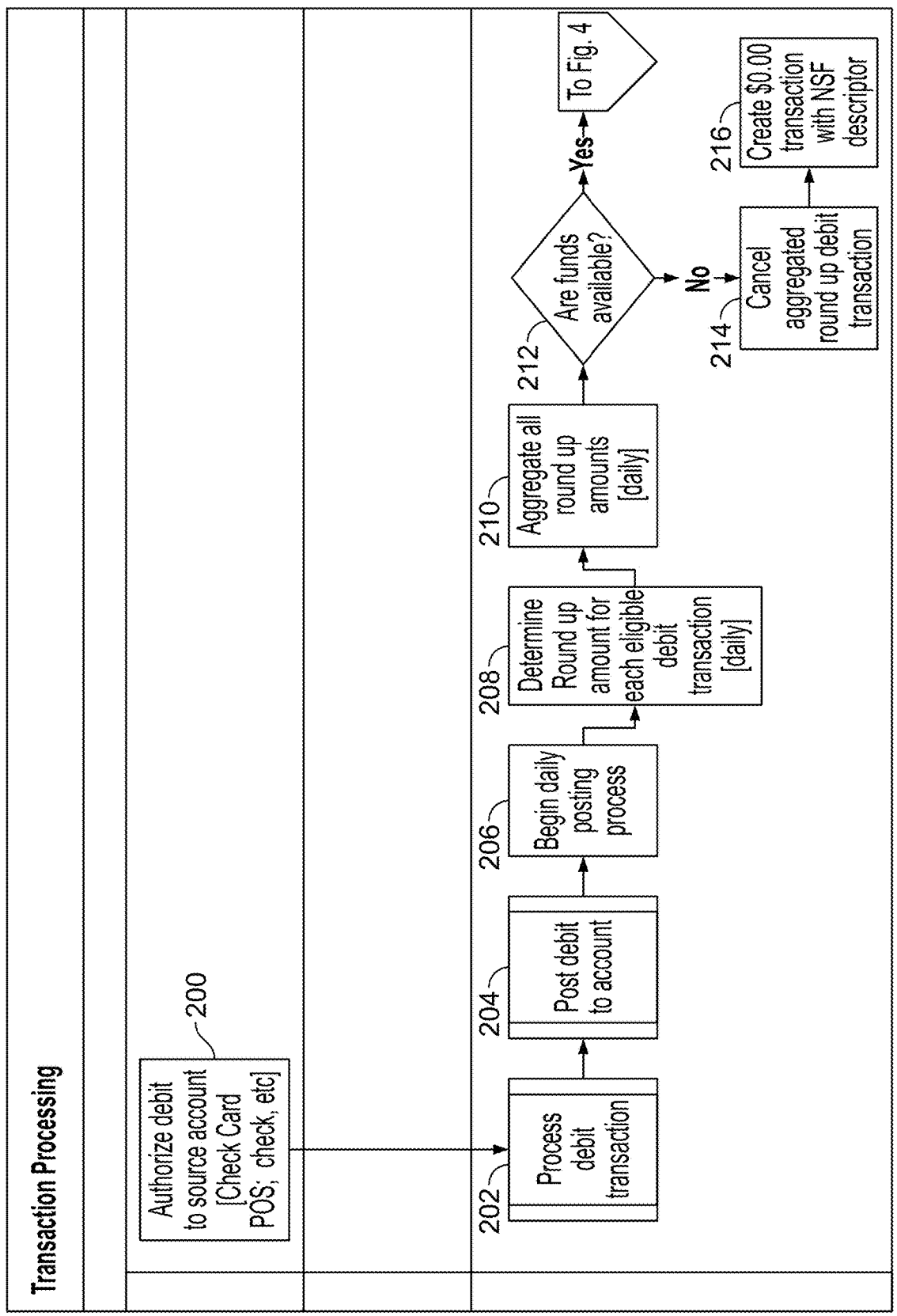
FIG. 3 is a flow diagram of the functionality performed by a server in accordance with one embodiment of the present invention to daily process the automatic savings transaction.

FIG. 3 is a flow diagram of the functionality performed by server 16 in accordance with one embodiment of the present invention to daily process the automatic savings transaction.

200: The debit to the source account (e.g., check card POS, check, etc.) selected at 102 is authorized.

202: The debit transaction, such as a purchase at POS 12 using a debit card, is processed.

204: The debit transaction is posted to the source account.

206: The daily posting transaction begins.

208: The round up amount (or other savings amount) for each eligible debit transaction is determined. This occurs on a daily basis.

210: All round up amounts are aggregated. This occurs on a daily basis. By aggregating the round ups for one daily posting, overdrafts to the source account can be avoided. In one embodiment, the daily posting occurs at the end of the day to further avoid overdrafts.

212: A determination is made if funds are available in the source account. If not, the aggregated round up debit transaction is cancelled (214) and a $0.00 transaction is created with a no funds in source account descriptor (216).

Figure 4:
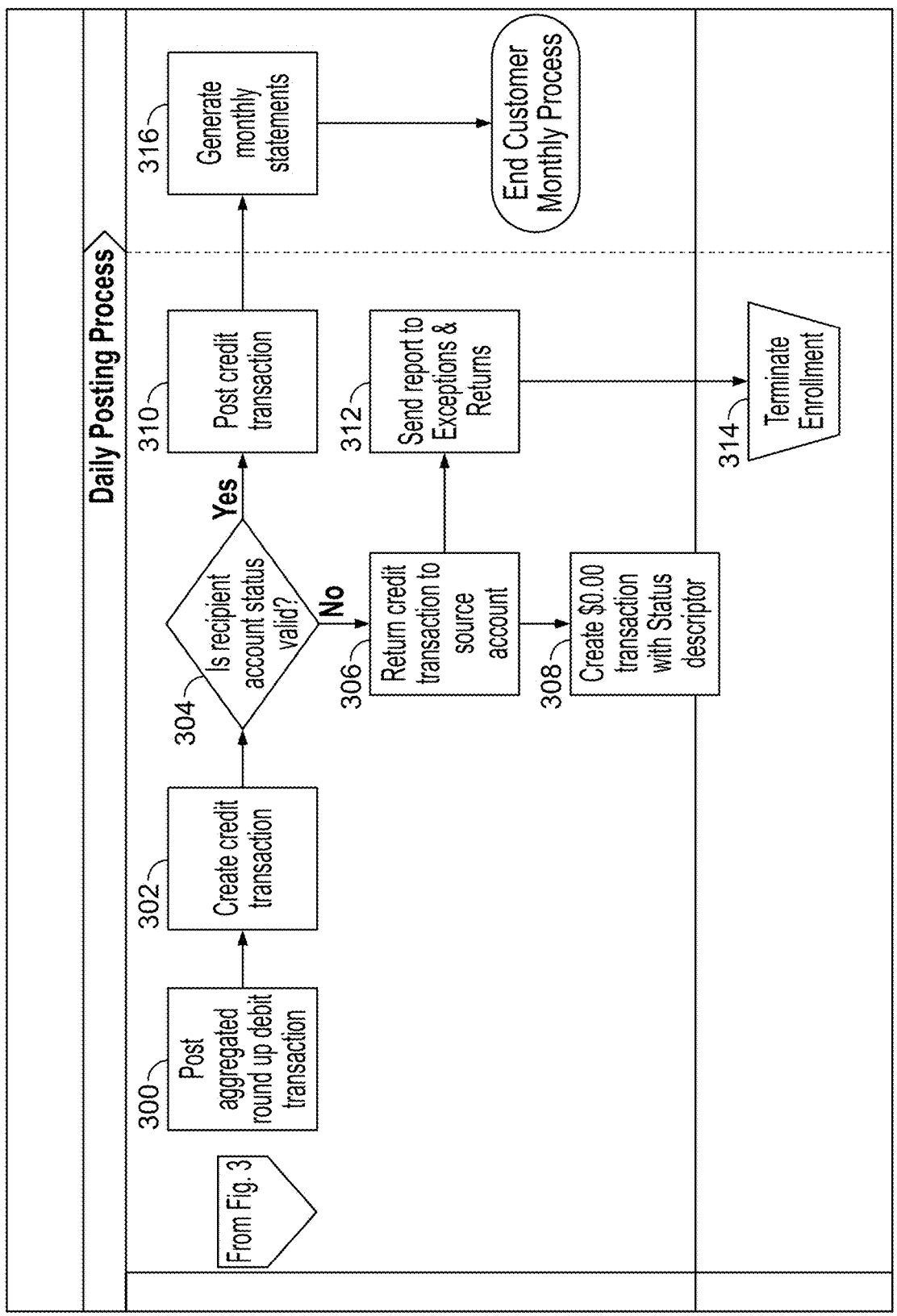
FIG. 4 is a flow diagram of the functionality performed by a server in accordance with one embodiment of the present invention to perform a daily posting of the automatic savings transaction.

FIG. 4 is a flow diagram of the functionality performed by server 16 in accordance with one embodiment of the present invention to perform a daily posting of the automatic savings transaction.

300: If funds are determined to be available at 212, the aggregated round up debit transaction is posted.

302: The credit transaction is created.

304: A determination is made if the recipient account(s) selected at 106 is valid. If it is valid, the credit transaction is posted (310).

306: If the recipient account(s) is not valid at 304, the credit transaction is returned to the source account and a $0.00 transaction is created with a status descriptor. A report of the invalid source account is sent to an "exceptions & returns" file and enrollment of the automatic savings account for that customer is terminated (312, 314).

316: Monthly statements are generated that include the automatic savings function. Both the source and recipient accounts may display a month-to-date and year-to-date summary of round up transfers on their statements.

Figure 5:
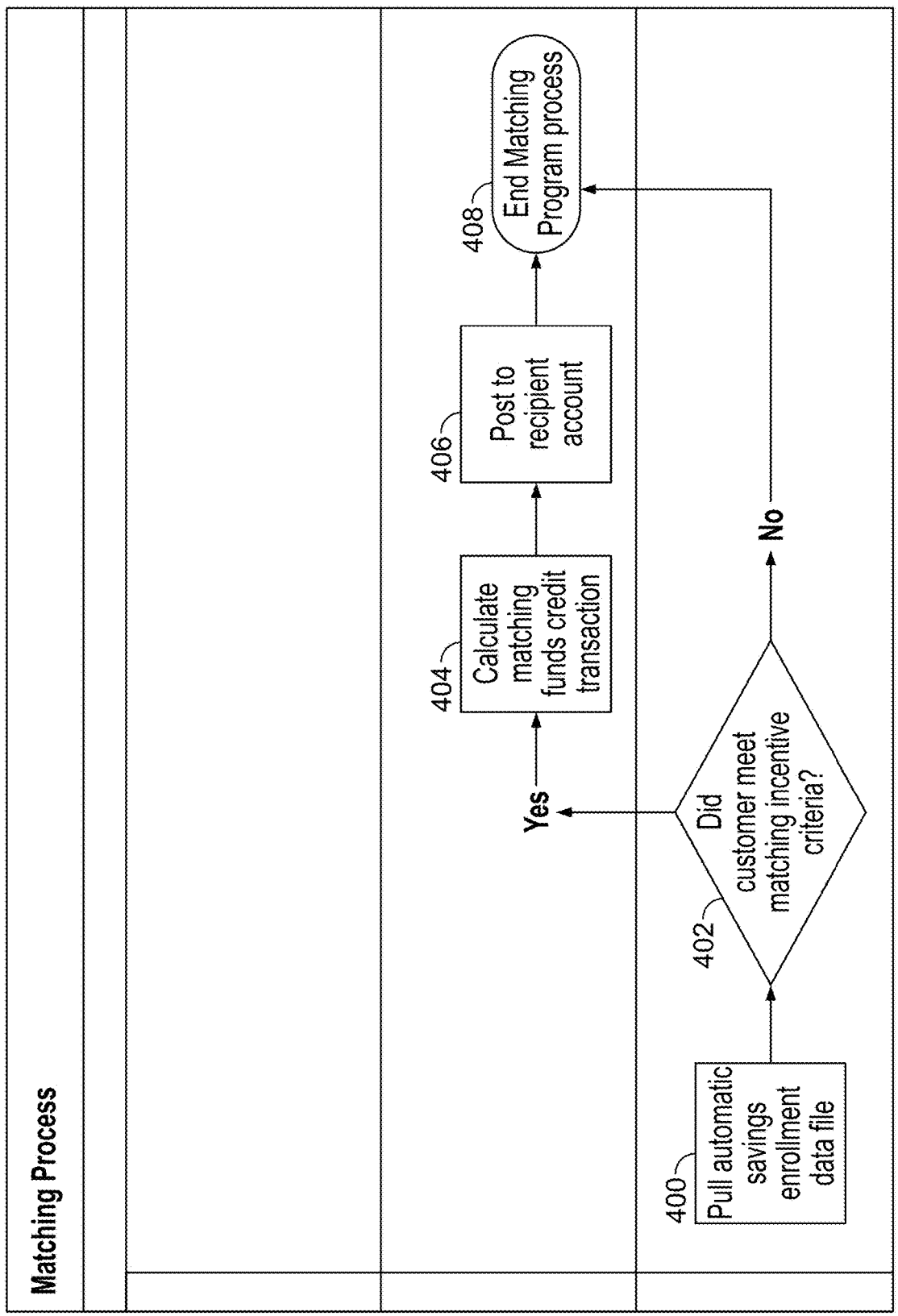
FIG. 5 is a flow diagram of the functionality performed by a server in accordance with one embodiment of the present invention to implement a matching process in conjunction with the automatic savings program.

FIG. 5 is a flow diagram of the functionality performed by server 16 in accordance with one embodiment of the present invention to implement a matching process in conjunction with the automatic savings program. A bank or other organization can implement the matching process in order to encourage more customers to enroll in the automatic savings program, or to encourage customers to modify their behavior for the benefit of the bank, such as to use their debit cards more often, use checks less, switch to electronic statements, use check safekeeping, etc. The bank can offer to match the round up or other savings amount for a fixed time period, a permanent time period, or other type of arrangement (e.g., every 10th transaction, $0.05 for every transaction, etc.).

400: During the daily posting process of FIG. 4, or at another point in the process (e.g., quarterly, annually, etc.), the customer data file for the automatic savings program is pulled. The data file stores all transactions eligible for matching and other data, such as the length of enrollment for the customer, that can be used to determine if the customer has met the matching incentive criteria.

402: It is determined if the customer met the matching incentive criteria. If not, the matching process is ended (408).

404: If the customer meets the matching incentive at 402, the matching funds credit transaction is calculated. The matching funds is then posted to the recipient account (406).

As disclosed, an automatic savings program in accordance to embodiments of the invention provides an easy and automatic method for a customer to save, and can encourage increased savings.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising:
receiving, by a computer server from a point-of-sale device, information identifying a first financial transaction initiated at the point-of-sale device;
posting, by the computer server, the first financial transaction to a source account;
calculating, by the computer server, a first savings amount by rounding a transaction amount of the first financial transaction to a nearest whole monetary amount wherein the first savings amount is a difference between the transaction amount and the nearest whole monetary amount;
calculating, by the computer server, an aggregate savings amount by aggregating the first savings amount and a second savings amount calculated for a second financial transaction, which is initiated at the point-of-sale device, posted to the source account;
performing, by the computer server, the calculating the aggregate savings amount for each subsequent financial transaction posted to the source account until an end of day;
postponing, by the computer server, to a single time at the end of the day, a step of determining that the aggregate savings amount is available in the source account;
determining, by the computer server only once at the end of the day, that the aggregate savings amount is available in the source account before debiting the aggregate savings amount from the source account, wherein computing load on the computer server is reduced because of the postponing by the computer server; and
debiting, by the computer server, at least a portion of the aggregate savings amount from the source account to an investment account;
wherein computing load on the point-of-sale device is reduced because the calculation of the first savings amount is deferred to the computer server.

2. The method of claim 1, further comprising:
crediting the investment account by an amount matching the aggregate savings amount.

3. The method of claim 1, further comprising:
crediting the investment account by an amount equaling a predetermined amount.

4. The method of claim 1, wherein the source account is a checking account.

5. The method of claim 1, wherein the first financial transaction is initiated at the point-of-sale device by a check card associated with the source account.

6. The method of claim 2, further comprising:
determining that the first financial transaction is eligible to be matched.

7. The method of claim 1, further comprising:
receiving, at the computer server, input from a holder of the source account, wherein the input comprises information about an account selected as the source account.

8. The method of claim 1, wherein:
a plurality of financial transactions posted to the source account during a predetermined time period comprises the first financial transaction and the second financial transaction; and
calculating the aggregate savings amount comprises aggregating a respective savings amount calculated for each of the plurality of financial transactions.

9. The method of claim 8, wherein:
the predetermined time period is a day.

10. The method of claim 1, wherein:
the investment account is selected by a holder of the source account.

11. The method of claim 1, further comprising:
receiving, by the computer server, a selection of one or more types of financial transactions; and
determining, by the computer server, that the first financial transaction is one of the types of financial transactions selected.

* * * * *

UNITED STATES PATENT AND TRADEMARK OFFICE
CERTIFICATE OF CORRECTION

PATENT NO. : 10,628,808 B2  
APPLICATION NO. : 14/109269  
DATED : April 21, 2020  
INVENTOR(S) : Carretta et al.

Page 1 of 1

It is certified that error appears in the above-identified patent and that said Letters Patent is hereby corrected as shown below:

On the Title Page

Item (72) Inventors, Line 8:  
Delete "Witchita," and insert --Wichita,--

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*